United States Patent [19]

Flatau

[11] Patent Number: 4,507,043
[45] Date of Patent: Mar. 26, 1985

[54] COUNTERBALANCE ROBOT ARM

[75] Inventor: Carl R. Flatau, Middle Island, N.Y.

[73] Assignee: Textron, Inc., Providence, R.I.

[21] Appl. No.: 417,231

[22] Filed: Sep. 14, 1982

[51] Int. Cl.³ .............................................. G66C 23/00
[52] U.S. Cl. ..................................... 414/719; 414/917; 901/15; 901/48
[58] Field of Search ............................ 901/48, 15, 14; 414/917, 735, 733, 719

[56] References Cited

U.S. PATENT DOCUMENTS 4,234,150 11/1980 Mee et al. ......................... 901/15 X

FOREIGN PATENT DOCUMENTS 20552 2/1977 Japan ................................ 414/917 X

*Primary Examiner*—Leslie J. Paperner
*Assistant Examiner*—Donald W. Underwood
*Attorney, Agent, or Firm*—Mattern, Ware, Stoltz & Fressola

[57] ABSTRACT

A robot forearm is counterbalanced by a drive arm. A main arm has two parallel sections whose ends are pivotally connected to the forearm and drive arm to maintain a parallel relationship between the forearm and the drive arm. A medial portion of one main arm section is pivotably mounted on a turntable pedestal. A drive motor and drive system mounted on the drive arm are connected to the other main arm section for moving the drive arm relative to the main arm. The drive system includes a harmonic drive speed reducer.

15 Claims, 7 Drawing Figures

COUNTERBALANCE ROBOT ARM

BACKGROUND OF THE INVENTION

This invention relates generally to robots and manipulators and more particularly has reference to a counter-balanced arm assembly for a robot or manipulator.

In the design of robots and manipulators, it is necessary to provide an input motion for each corresponding output motion of the robot or manipulator. The input motions are generally provided by motor actuators and drive systems mounted on the arm assembly of the robot or manipulator. These components add mass to the arm assembly and tend to produce work and gravitational unbalance in the arm. A portion of the power supplied to the drive systems is lost in overcoming these effects.

It is thus desirable to provide means for balancing the arm assembly. Known attempts at counter-balancing have proved unsatisfactory in many respects.

SUMMARY OF THE INVENTION

The present invention overcomes many problems which exist in the prior art devices.

The present invention provides a robot main arm with parallel sections pivotably connected to an elbow. A first section is medially supported on a trunion which is rotatably supported on a turntable pedestal. A counter-balancing drive arm is pivoted at one end of the first section and a forearm elbow is pivotably connected to the opposite end of the first section. The trunion, drive arm pivot and elbow axes lie in a plane which pivots about the trunion. Opposite angles which the forearm and drive arm form with that plane are maintained equal. A drive gear cooperates with an idler gear and a main gear to turn the drive arm about its pivot mounting, pushing or pulling the second main arm section which has its lower end pivotably attached to the drive arm and its upper end pivotably attached to the elbow.

Objects of the invention are, therefore, to provide an improved robot or manipulator and to provide an improved arm assembly for a robot or manipulator.

Another object of the invention is to provide an arm assembly which is counterbalanced.

A further object of the invention is to provide an arm assembly wherein a drive arm remains parallel to a forearm to balance the forearm, the parallel relationship being maintained by a main arm having two parallel sections pivotably connected to the forearm and drive-arm.

A further object of the invention is to provide a counterbalancing drive arm mounting drive motors and drive systems.

Yet another object of the invention is to provide a drive system for a counterbalanced robot arm which includes a harmonic drive speed reducer.

Yet another object of the invention is to provide counterbalanced robot apparatus comprising a main arm having first and second parallel sections respectively having proximal and distal ends, having a shoulder trunion connected to one of the sections between proximal and distal ends thereof, a forearm assembly having an elbow section with first and second pivots, the distal end of the first section being connected to the first pivot, and the distal end of the second section being connected to the second pivot, a drive arm having an outer end and an inner end, a first pivotal connection at the inner end pivotally connected to the first section near a proximal end thereof, a second pivotal connection at a medial portion of the drive arm pivotally connected to the second section near a proximal end thereof, and drive motor means connected to the drive arm at an outer end remote from the first and second main arm sections, and drive means connected to the motor means, to at least one of the main arm sections and to the drive arm for tending to change angular relationship between the drive arm and at least one of the main arm sections, and means for maintaining substantially equally opposite angles between the forearm assembly and at least one main arm section and between that one main arm section and the drive arm.

These and other and further objects and features of the invention are apparent in the disclosure which includes the above and below specification and claims and drawings.

BRIEF DESCRIPTION OF THE DRAWINGS

FIG. 8 is a schematic representation of the arm assembly.

DETAILED DESCRIPTION OF THE DRAWINGS

Figure 2:
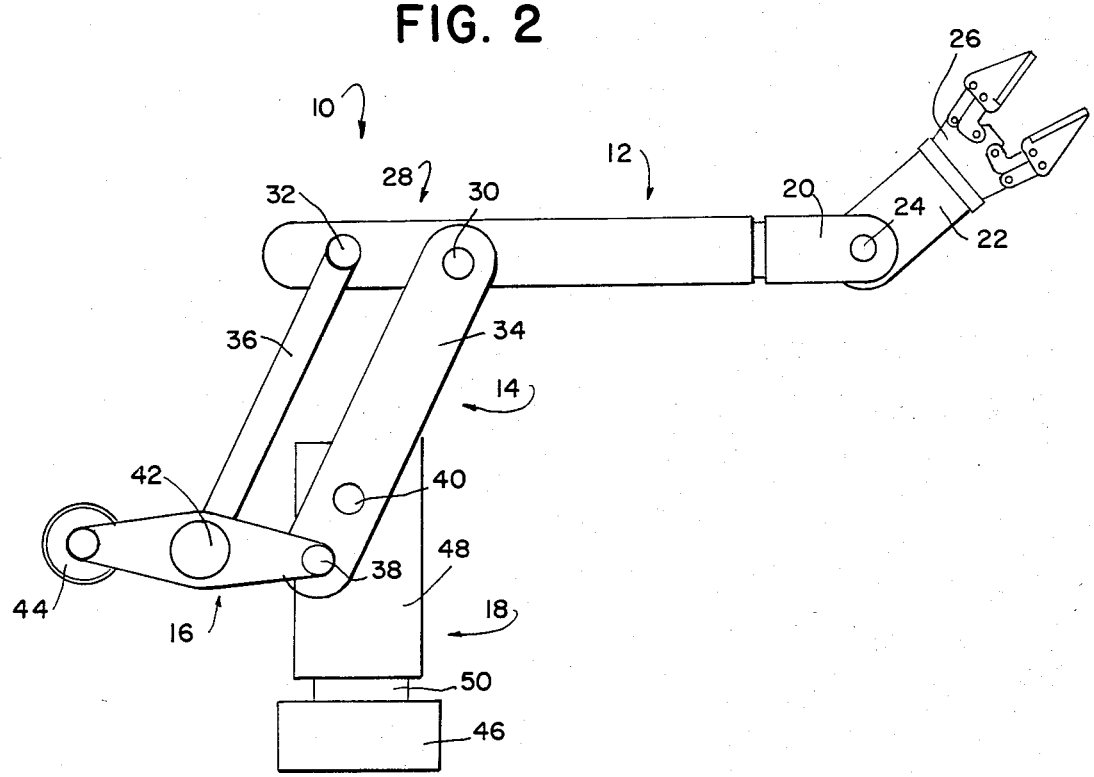
FIG. 2 is a simplified diagramatic illustration of an arm assembly embodying features of the present invention.
Figure 1:
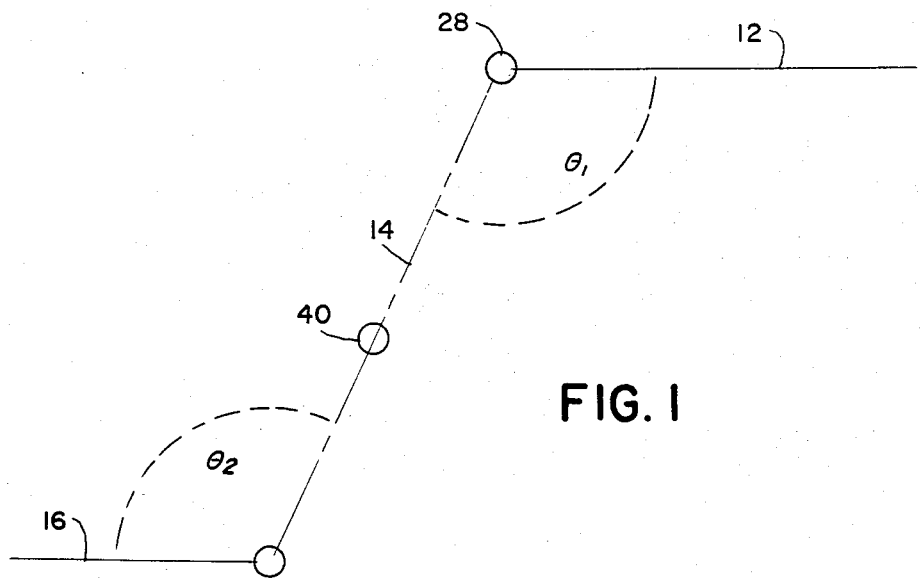
FIG. 1 is a schematic diagram showing the function of an arm assembly embodying features of the present invention.

The basic concept of the present invention is best understood by reference to FIGS. 1 and 2.

Referring to FIG. 2, the robot arm 10 of the present invention includes a forearm 12, a main arm 14 and a drive arm 16 mounted on a turntable pedestal 18.

The forearm 12 is a longitudinally extending hollow support structure. The outer end 20 of the forearm 12 is a hollow support structure which is axially rotatable with respect to the remainder of the forearm 12. A wrist assembly 22 is mounted on the outer end portion 20 of the forearm 12 by a pivot connection 24 which extends transversely across the outer end portion 20 of the forearm 12. The pivot connection 24 allows the wrist 22 to pivot with respect to the outer end portion 20 of the forearm 12. A tong assembly 26 is connected to the end of the wrist assembly 22 and is actuated thereby.

Power for rotating the outer end portion 20 of the forearm 12, for pivoting the wrist 22, and for actuating the tong assembly 26 is supplied by remotely located motors (not shown). Power from the motors is communicated through drive systems (not shown) which extend through the forearm and are operatively connected to actuating mechanisms for the respective elements. The structure and function of the drive systems and the actuating mechanisms are known and form no part of the present invention.

An elbow assembly 28 is mounted on the inner end of the forearm 12. The elbow includes a first pivot connection 30 spaced from the inner end of the forearm 12 and a second pivot connection 32 located between the first pivot connection 30 and the inner end of the forearm 12. The pivot connections 30 and 32 are longitudinally aligned along the forearm 12.

The main arm 14 includes first and second parallel sections 34 and 36 respectively which extend between the forearm 12 and the drive arm 16. The first section 34 is a support arm having a distal end mounted on the first pivot connection 30 and a proximal end connected to the inner end of the drive arm 16 by a first pivot connection 38. The first section 34 is pivotably mounted on the turntable pedestal 18 by a shoulder trunion 40 which is connected to the first section between the pivot connections 30 and 38 at the ends of the first section 34. The second section 36 of the main arm 14 is a support arm which has a distal end connected to the second pivot connection 32 of the elbow assembly 28 and a proximal end connected to a medial portion of the drive arm 16 by a second pivot connection 42.

The first and second pivot connections 38 and 42 on the drive arm 16 are longitudinally aligned along the arm 16 and are spaced apart by a distance equal to the distance between the elbow pivot connections 30 and 32. The first and second sections 34 and 36 of the main arm 14 are identical in length so that the distance between the first pivot connections 30 and 38 is identical to the distance between the second pivot connections 32 and 42.

The drive arm 16 is a longitudinally extending hollow support arm which mounts a drive assembly. The drive assembly includes a drive motor 44 mounted on the outer end of the drive arm 16 and a drive system (not shown) which extends through the drive arm 16 between the motor 44 and the second pivot connection 42. The drive system receives input power from the motor 44 and uses that power to cause the second section 36 of the main arm 14 to pivot about the second pivot connection 42. Details of the drive system will be described later.

The turntable pedestal 18 is a support structure which includes a base 46 and an upper support member 48. The shoulder trunion 40 is connected to the upper support member 48. The upper support member 48 is connected to the base 46 by a rotatable post 50. A motor and drive system (not shown) housed in the pedestal 18 imparts rotation to the post 50 to cause the arm assembly 10 to rotate about the axis of the pedestal 18.

The counterbalancing feature of the present invention can now be best understood by reference to FIGS. 1 and 2.

Recalling that the first and second sections 34 and 36 of the main arm 14 are parallel and that the distance between the elbow pivot connections 30 and 32 is equal to the distance between the drive arm pivot connections 38 and 42, it will be readily appreciated that a line extending between the first pivots 30 and 38 is parallel to a line extending between the second pivot 32 and 42. Further recalling that the lengths of the first and second main arm sections 34 and 36 are equal and that the pivot connections 30, 32, 38 and 42 are longitudinally aligned along their respective arms 12 and 16, it will be readily appreciated that a line extending between the elbow pivots 30 and 32 is parallel to a line extending between the drive arm pivots 38 and 42. Those intersecting pairs of parallel lines define a parallelogram. Although the angle between the intersecting pairs will vary as the arms move about the pivotal connections, the shape defined by the lines will always remain a parallelogram. Hence, the forearm 12 will always be kept in parallel with the drive arm 16.

Referring to FIG. 1, the forearm 12 and drive arm 16 are schematically illustrated by spaced-apart parallel lines. The main arm 14 is schematically illustrated by a single line which extends between the inner ends of the forearm 12 and drive arm 16. It can be shown that, with proper positioning of the shoulder trunion 40 on the main arm 14, the entire arm assembly, i.e., the main arm 14, forearm 12 and drive arm 16, is balanced when the angle $\theta_1$ between the forearm 12 and main arm 14 is equal to the angle $\theta_2$ between the main arm 14 and the drive arm 16.

Consider the schematic representation of the arm assembly shown in FIG. 8, where:

$M_{11}$ is the equivalent point mass of the drive arm 16;

$M_{21}$ is the equivalent point mass of the portion of the main arm 14 between the shoulder trunion 40 and the drive arm 16;

$M_{22}$ the equivalent point mass of the portion of the main arm 14 between the shoulder trunion 40 and the forearm 12;

$M_{12}$ is the equivalent point mass of the forearm 12;

$L_{11}$ is the length of the drive arm 16;

$L_{21}$ is the length of the main arm 14 between the shoulder trunion 40 and the drive arm 16;

$L_{22}$ is the length of the main arm 14 between the shoulder trunion 40 and the forearm 12;

$L_{12}$ is the length of the forearm 12;

$\beta$ is the angle between the drive arm 16 and main arm 14;

$\beta'$ is the angle between the forearm 12 and the main arm 14;

$\alpha$ is the angle between the main arm 14 and an imaginary axis mutually perpendicular to the axis of the shoulder trunion 40 and the axis of the pedestal 18;

$\alpha'$ is the angle between the main arm 14 and said imaginary axis;

A is the axis of rotation of the shoulder trunion 40;

B is said imaginary axis; and

C is the axis of rotation of the pedestal 18.

To obtain balance in a gravitational field one must satisfy the following relationships:

$$m_{12}(L_{12}\cos\beta' + L_{22}\cos\alpha') + m_{22}(L_{22}\cos\alpha) =$$
$$m_{11}(L_{11}\cos\beta + L_{21}\cos\alpha) + M_{21}(L_{21}\cos\alpha)$$
$$m_{12}(L_{12}\cos\beta') = m_{11}(L_{11}\cos\beta)$$

In the arm assembly of the present invention, $\alpha=\alpha'$ because the main arm 14 has a straight integral member and $\beta=\beta'$ because the forearm 12 and drive arm 16 are constrained to a parallel relationship. Hence, we obtain for all $\alpha$ and $\beta$ $$m_{12}L_{12}=m_{11}L_{11}$$

$$(m_{12}+m_{22})L_{22}=(m_{11}+m_{21})L_{21}$$

as requirements for balance of the entire arm assembly. It will be readily appreciated that the latter requirement can be satisfied by proper positioning of the shoulder trunion 40 on the main arm 14, and proper proportioning of $L_{11}$, $L_{12}$, $m_{11}$, $m_{21}$, $m_{22}$, $m_{12}$.

It will be recognized that the foregoing requirements are also satisfied for rotation around the C axis.

Inasmuch as the forearm 12 and drive arm 16 are constrained to a parallel relationship, it will be apparent that the angles $\theta_1$ and $\theta_2$ will remain equal regardless of the angular orientation of the main arm 14 with respect to the forearm 12 and drive arm 16.

When the entire arm assembly is balanced, the drive assembly can act as if it is shifted to any one of the pivot connections 30, 32, 38 and 42. In the arrangement shown in FIG. 2, the drive acts as if it is shifted to the first elbow pivot 30.

As previously noted, the drive arm 16 houses a drive system which causes the second section 36 of the main arm 14 to pivot about the second pivot connection 42. Pivotal movement of the second main arm section 36 toward the first main arm section 34 urges the inner end of the forearm 12 toward the first main arm section 34. This in turn causes the second main arm section 36 to push the outer end of the drive arm 16 away from the first main arm section 34. The forearm 12 and drive arm 16 thus move closer toward alignment with imaginary longitudinal axes extending from the ends of the main arm 14. By controlling the pivotal motion of the first main arm section 34 about the shoulder trunion 40, desired vertical and transverse movement of the outer end of the forearm 12 can be obtained.

Similarly, pivotal motion of the second main arm portion 36 away from the first main arm section 34 urges the inner end of the forearm 12 away from the first main arm section 34. This in turn causes the second main arm section 36 to pull the outer end of the drive arm 16 toward the forearm 12. The forearm 12 and drive arm 16 thus move further out of alignment with the imaginary axes extending from the ends of the main arm 14. Again, desired vertical and lateral motion of the outer end of the forearm 12 can be obtained by controlling the pivotal motion of the first main arm section 34 about the shoulder trunion 40.

Figure 7:
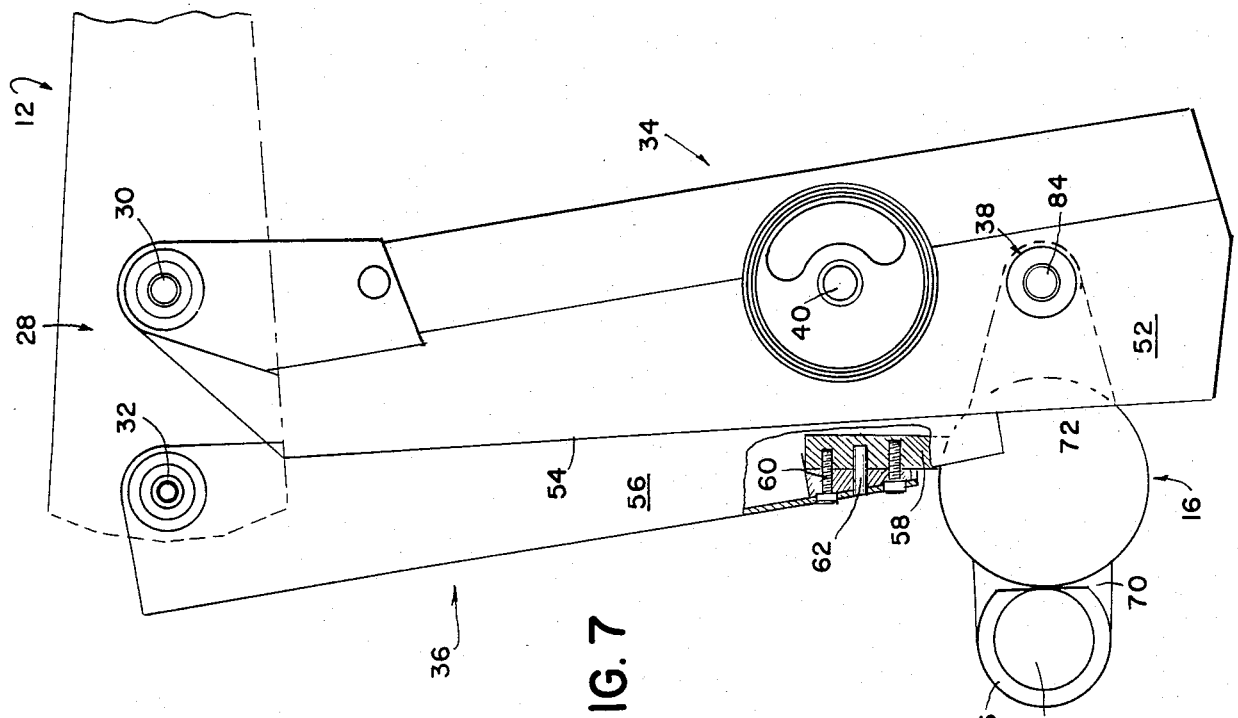
FIG. 7 is a side elevational view, partly broken away, of the apparatus shown in FIG. 6.
Figure 6:
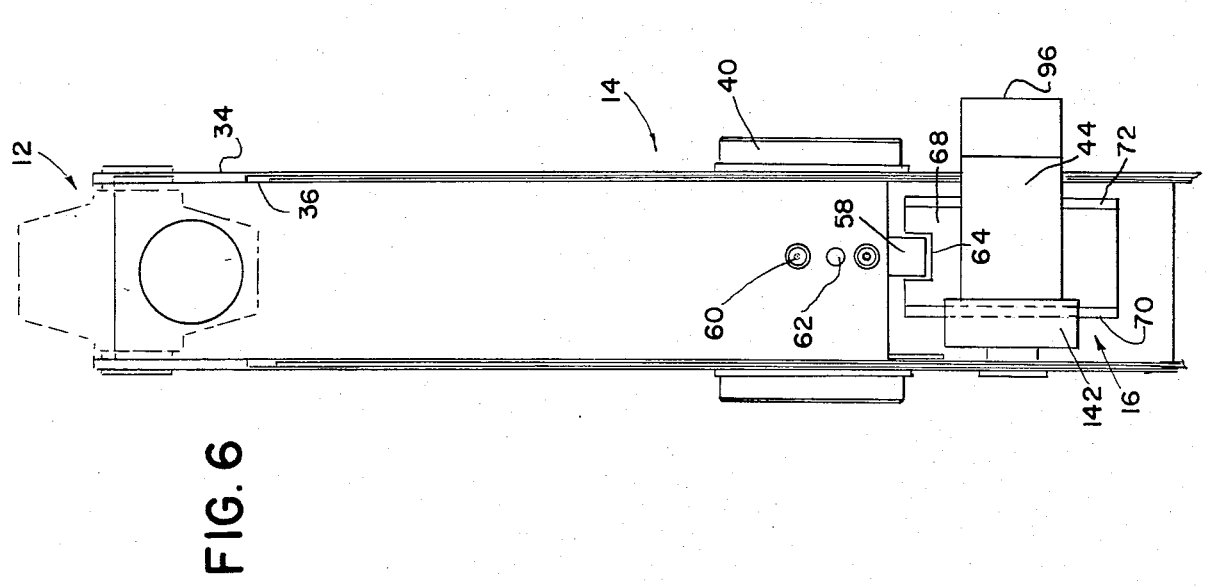
FIG. 6 is a rear end view showing details of the forearm, main arm and drive arm shown in FIG. 2.

The preferred construction of the main arm 14 is best shown in FIGS. 6 and 7.

The first main arm section 34 is a channel member having spaced-apart side walls 52 whose longitudinal edges define an open side 54. The second main arm section 36 is a channel member which has a width which is less than the width of the first main arm section 34. The sides 56 of the second main arm section 36 fit within the sides 52 of the first main arm section 34 so that the second main arm section 36 can be received through the open side 54 of the first main arm section 34 when the main arm 14 engages in pivotal movement about the pivot connections 30, 32, 38 and 42 and the shoulder trunion 40.

Manufacturing costs and operating weights are reduced by making the main arm sections 34 and 36 from channel members rather than from closed structures. The interfitting relationship of the main arm sections 34 and 36 allows the arms to reinforce each other and thereby compensate for any relative structural weakness of channel members. Moreover, the interfitting relationship results in a main arm assembly which is desirably compact.

As shown in FIGS. 6 and 7, the second main arm section 36 is operatively connected to the drive system mounted on the drive arm 16 by a drag link 58. The link 58 is a longitudinally elongated member having a generally rectangular cross-sectional shape. The distal end of the link 58 extends into the channel member forming the second main arm section 36 and is connected to the base wall of that channel member by screws 60 and dowel pins 62. The proximal end of the drag link 58 extends from the second main arm section 36 and is received in an opening 64 formed in a stationary outer cylinder 68 of the drive system. The link 58 is connected to a rotating drive cylinder (not shown) in the drive system for rotational motion therewith in a manner which will be more fully described later.

Figure 4:
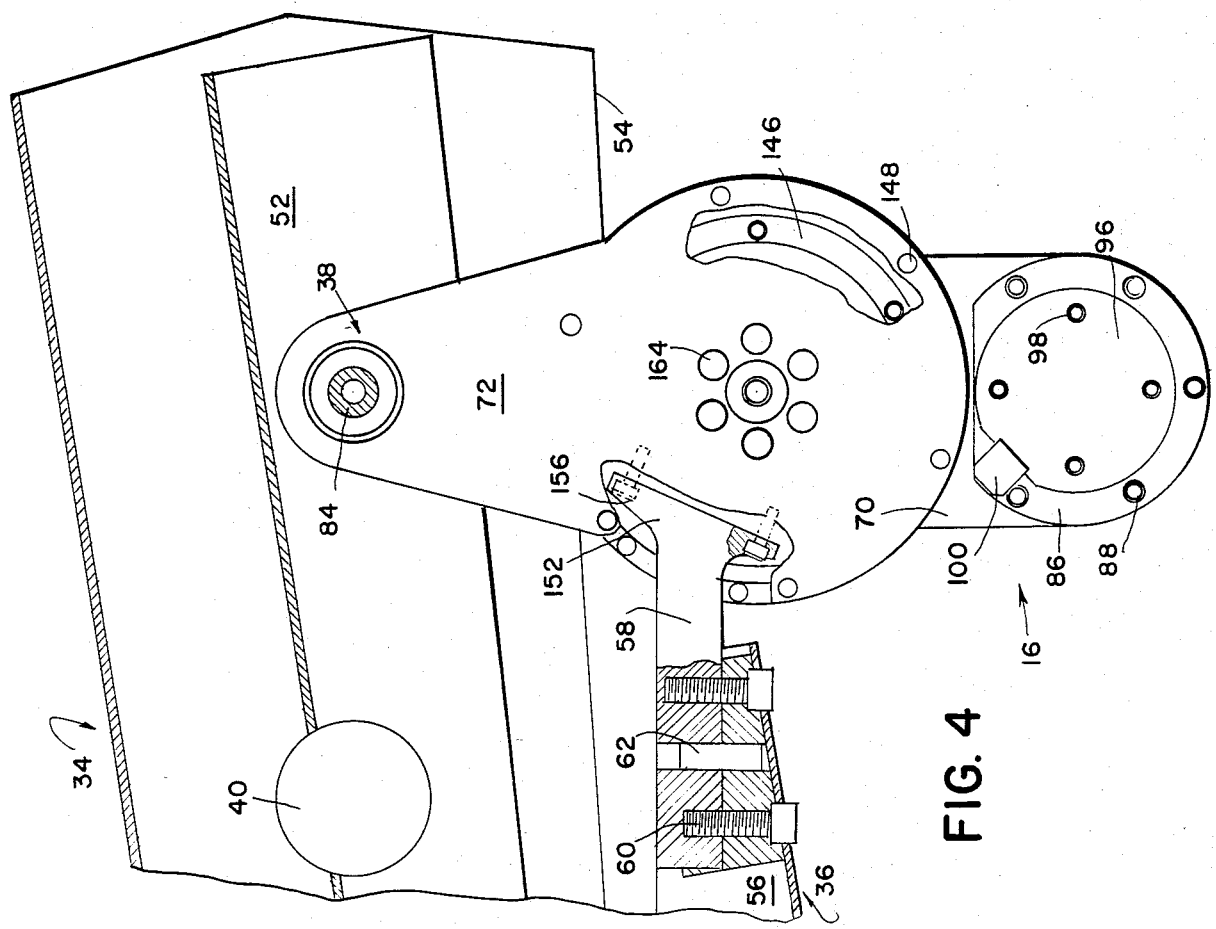
FIG. 4 is a side elevational view, partly broken away, of the opposite side of the drive arm shown in FIG. 3 and of the connection between the drive arm and the main arm.
Figure 3:
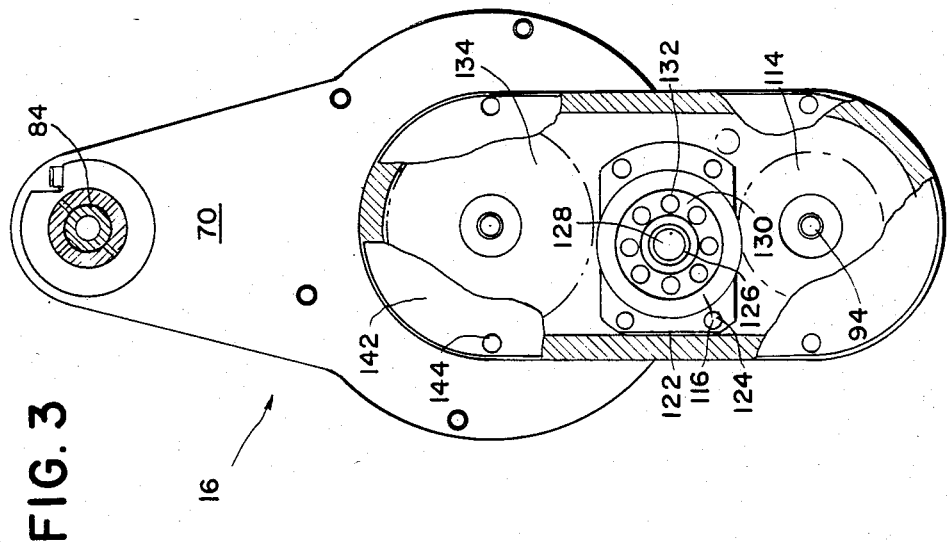
FIG. 3 is a side elevational view, partly broken away, of the drive arm used with the apparatus shown in FIG. 2.
Figure 5:
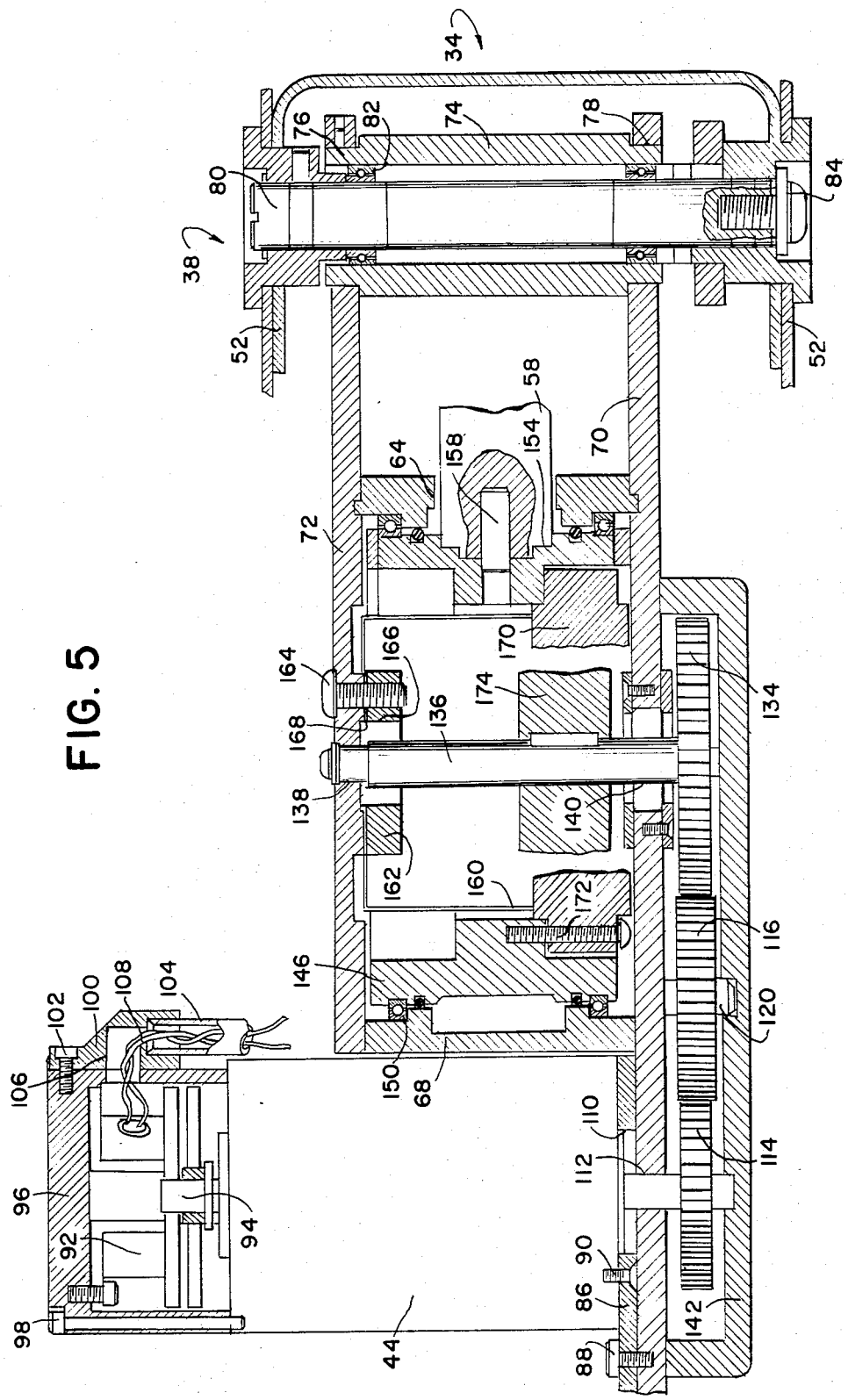
FIG. 5 is a sectional view of the drive arm shown in FIGS. 3 and 4.

Details of the drive arm 16, drive motor 44 and drive system are best shown in FIGS. 3-5.

The drive arm 16, per se, is formed generally by a motor plate 70 and a housing plate 72. The plates 70 and 72 are spaced apart and parallel. A spacer tube 74 extends perpendicularly to the plates 70 and 72 and has reduced diameter ends 76 which are received in openings 78 formed in the inner ends of the plates 70 and 72. A shaft 80 extends through the spacer tube 74 and is rotatably supported therein by bearings 82. The ends of the shaft 80 extend from the tube 74 and are connected to the sides 52 of the first main arm section 14 by screws 84. The shaft 80 and tube 74 thus provide the first pivot connection 38.

The outer end of the motor plate 70 extends beyond the outer end of the housing plate 72 and has a motor mounting plate 86 connected thereto by screws 88. The inner end of the motor mounting plate 86 is spaced slightly outwardly of the outer end of the housing plate 72. The drive motor 44 is mounted on the motor mounting plate 86 and is secured thereto by screws 90. The preferred motor 44 has a generally cylindrical shape and extends axially beyond the housing plate 72.

A conventional motor brake assembly 92 is mounted on the end of the motor 44 remote from the mounting plate 86 and operatively connected to the motor shaft 94. The brake assembly 92 is held in position by a cap 96 which is secured to the motor 44 by screws 98. A brake wire passage elbow 100 connected to the cap 96 by a screw 102 supports a brake wire passage tube 104. The passageway through the elbow 100 and tube 104 communicates with the interior of the cap 96 through an opening 106 formed in the sidewall of the cap 96. The brake wires 108 extend through the opening 106, elbow 100 and tube 104 for connecting an external source of power.

The motor shaft 94 extends through an opening 110 in the motor mounting plate 86 and an opening 112 in the motor plate 70. An input pinion 114 connected to the end of the shaft 94 is generally parallel to the motor plate 70. The input pinion 114 meshes with an idler gear 116 rotatably mounted on a shaft 120 upstanding from a gear mounting plate 122 connected to the motor plate 70 inwardly of the motor mounting plate 86 by screws 124. Bearings (not shown) concentrically disposed around the shaft 120 and held thereon by a bearing retainer 126 and screw 128 connected to the end of the shaft 120 and by a retaining ring 130 and screws 132 connected to the gear 116 facilitate rotation of the gear 116 on the shaft 120.

The idler gear 116 meshes with an input gear 134 connected to the end of a shaft 136 which extends perpendicularly between the housing plate 72 and motor plate 70 and is rotatably supported in openings 138 and 140 formed in the plates 72 and 70 respectively.

The input pinion 114, idler gear 116 and input gear 134 are enclosed by a gear cover 142 which is connected to the motor plate 70 by the screws 144.

The above-mentioned stationary outer cylinder 68 is positioned between the housing plate 72 and the motor plate 70 and is concentrically disposed about the shaft 136. The cylinder 68 is fixed to the housing plate 72 by screws 148. The rotating drive cylinder 146 is concentrically disposed within the stationary cylinder 68 and is rotatably supported therein by bearings 150 positioned between the outer surface of the rotating cylinder 146 and the inner surface of the stationary cylinder 68.

The connection between the drag link 58 and the drive cylinder 146 is best understood by reference to FIGS. 4 and 5.

The proximal end of the drag link 58 is formed into a foot 152. The foot 152 extends through the opening 64 in the stationary cylinder 68 and is received in a recess 154 formed in the outer surface of the drive cylinder 146. The foot 152 is connected to the drive cylinder 146 by screws 156 and dowel pins 158.

The shaft 136 and the drive cylinder 146 are operatively interconnected by a harmonic drive speed reducing assembly.

The harmonic drive includes a flexible cup-like spline 160 concentrically disposed about the shaft 136. The spline 160 is fixed to the housing plate 72 by sandwiching the base of the spline between the plate 72 and a nut 162 connected to the plate 72 by screws 164. Aligned axial openings 166 and 168 in the nut 162 and spline 160 respectively permits passage of the shaft 136 therethrough.

The outer surface of the spline 160 meshes with the inner surface of a ring-like driven gear 170 concentrically disposed about the spline 160 and connected to the drive cylinder 146 by screws 172. The inner surface of the driven gear 170 has a greater number of teeth than the outer surface of the spline 160. Preferably, the driven gear 170 has two more teeth than the spline 160.

A wave generator 174 connected to the shaft 136 is concentrically disposed within the spline 160 and is generally aligned with the driven gear 170. The outer surface of the wave generator 174 contacts the inner surface of the spline 160 in a limited area. Rotation of the wave generator 174 revolves the point of contact about the axis of the shaft 136 and thus produces a wave which travels about the outer surface of the spline 160. The spline 160 meshes with the driven gear 170 in the vicinity of the wave peaks, thereby imparting rotation to the driven gear 170. The difference in the number of gear teeth between the driven gear 170 and the spline 160 causes the driven gear 170 to rotate at a slower speed than the spline wave.

It will be readily appreciated that the above described harmonic drive functions as a speed reducing mechanism.

Operation of the drive system can now be fully understood.

Actuation of the motor 44 causes a forward or reverse rotation of the motor shaft 94. This rotation is communicated through the input pinion 114, idler gear 116, input gear 134 and shaft 136 to the speed reducing assembly. Interaction of the wave generator 174, flexible spline 160 and driven gear 170 in the manner described above, imparts a rotation to the driven gear 170 which is considerably slower than the rotation of the shaft 136. Rotation of the driven gear 170 causes rotation of the drive cylinder 146. Rotation of the drive cylinder 146 causes the drive link 58 to pivot about the axis of the shaft 136. This in turn causes the second main arm section 36 to pivot about the same axis.

Pivotal movement of the second main arm section 36 about the axis of the shaft 136 causes corresponding pivotal movement of the forearm 12 and drive arm 16 about the pivot connections 30, 32 and 38. This results in the above-described realignment of the forearm 12 and drive arm 16 with respect to the main arm 14.

While the invention has been described with reference to specific embodiments, the exact nature and scope of the invention is defined in the following claims.

I claim:

1. Counterbalanced robot apparatus comprising a main arm having first and second substantially parallel main arm sections respectively having proximal and distal ends, a shoulder trunion connected to one of the sections between proximal and distal ends thereof, a forearm assembly having an elbow section with first and second pivots, the distal ends of the first main arm section being connected to the first pivot, and the distal end of the second main arm section being connected to the second pivot, a drive arm having an outer end and an inner end, a first pivotal connection at the inner end pivotally connected to the first main arm section near a proximal end thereof, a second pivotal connection at a medial portion of the drive arm pivotally connected to the second main arm section near a proximal end thereof, drive motor means connected to the drive arm at an outer end remote from the first and second main arm sections, drive means connected to the motor means, to at least one of the substantially parallel main arm sections and to the drive arm for changing the angular relationship between the drive arm and at least one of the main arm sections, and means, including the substantially parallel main arm sections, the forearm assembly and the drive arm, for maintaining substantially equal opposite angles between the forearm assembly and at least one main arm section and between that one main arm section and the drive arm.

2. The counterbalanced robot apparatus of claim 1 wherein the elbow section is located at an inner end portion of the forearm assembly.

3. The counterbalanced robot apparatus of claim 1 wherein the first and second pivots are generally aligned along the forearm assembly, the second pivot being located adjacent an end portion of the forearm assembly and the first pivot being located at a medial portion of the forearm assembly.

4. The counterbalanced robot apparatus of claim 2 wherein pivotal connections of the drive arm to the first section and to the second section are generally aligned along the drive arm.

5. The counterbalanced robot apparatus of claim 1 wherein the distance between the first pivot and the pivotal connection at the proximal end of the first section is substantially equal to the distance between the second pivot and the pivotal connection at the proximal end of the second section.

6. The counterbalanced robot apparatus of claim 5 wherein the distance between the first and second pivots is substantially equal to the distance between the pivotal connections at the proximal ends of the first and second sections.

7. The counterbalanced robot apparatus of claim 1 wherein a line between the first pivot and the first pivotal connection is substantially parallel to a line between the second pivot and the second pivotal connection.

8. The counterbalanced robot apparatus of claim 1 wherein a line between the first and second pivots is substantially parallel to a line between the first and second pivotal connections.

9. The counterbalanced robot apparatus of claim 1 wherein the motor means comprises a reversable motor having an output shaft and wherein the drive means comprises a drive pinion connected to the output shaft, a driven gear mounted on the drive arm, means to connect one of the first and second sections to the driven gear, and interconnection means for drivingly interconnecting the drive pinion and the driven gear.

10. The counterbalanced robot apparatus of claim 9 wherein the driven gear is connected to the proximal end of the second section for moving the proximal end of the second section with the driven gear.

11. The counterbalanced robot apparatus of claim 1 wherein the trunion is connected to the first section between the first pivot and the first pivotal connection.

12. The counterbalanced robot apparatus of claim 11 wherein the drive means is connected to the second main arm section.

13. The counterbalanced robot apparatus of claim 1 wherein the shoulder trunion is positioned between the forearm assembly and drive arm to simultaneously balance the main arm, forearm assembly and drive arm for all angular positions thereof.

14. The counterbalanced robot apparatus defined in claim 1 wherein the shoulder trunion is positioned between the forearm assembly and drive arm substantially to balance the main arm, with the forearm assembly pivotally connected to its distal end and the drive arm pivotally connected near its proximal end being in virtual equilibrium about the shoulder trunion means for all angular positions thereof.

15. Counterbalanced robot apparatus, comprising a main arm having first and second substantially parallel main arm sections respectively having proximal and distal ends, shoulder trunion means supportingly connected to the first main arm section between the proximal and distal ends thereof, a forearm assembly having an elbow section with first and second pivots, the distal end of the first main arm section being connected to the first pivot, and the distal end of the second main arm section being connected to the second pivot, a drive arm having an outer end and an inner end, the inner end being connected by a first pivotal connection to the first main arm section near a proximal end thereof, a medial portion of the drive arm being connected by a second pivotal connection to the second main arm section near a proximal end thereof, drive motor means connected to the drive arm at an outer end remote from the first and second main arm sections, speed reducer drive means connected to the motor means, to the second main arm section and to the drive arm for changing the angular relationship between the drive arm and the second main arm section, and means, comprising the substantially parallel drive arm and forearm assembly and the substantially parallel main arm sections, for maintaining substantially equal opposite angles between the forearm assembly and at least one main arm section and between that one main arm section and the drive arm, wherein a line between the first pivot and the first pivotal connection is substantially parallel to a line between the second pivot and the second pivotal connection, whereby a line between the first and second pivots is substantially parallel to a line between the first and second pivotal connections, and whereby the four respective transverse axes of the pivots and the pivotal connections intersect the plane of the main arm at the apices of a parallelogram.

* * * * *